US010216496B2

(12) United States Patent
Gao et al.

(10) Patent No.: US 10,216,496 B2
(45) Date of Patent: *Feb. 26, 2019

(54) DYNAMIC ALIAS CHECKING WITH TRANSACTIONAL MEMORY

(71) Applicant: International Business Machines Corporation, Armonk, NY (US)

(72) Inventors: Yaoqing Gao, Toronto (CA); William G. O'Farrell, Markham (CA); Denis Palmeiro, Milton (CA)

(73) Assignee: International Business Machines Corporation, Armonk, NY (US)

( * ) Notice: Subject to any disclaimer, the term of this patent is extended or adjusted under 35 U.S.C. 154(b) by 85 days.

This patent is subject to a terminal disclaimer.

(21) Appl. No.: 15/276,952

(22) Filed: Sep. 27, 2016

(65) Prior Publication Data

US 2018/0088917 A1    Mar. 29, 2018

(51) Int. Cl.
| | |
|---|---|
| *G06F 8/41* | (2018.01) |
| *G06F 9/46* | (2006.01) |
| *G06F 9/52* | (2006.01) |
| *G06F 8/30* | (2018.01) |

(52) U.S. Cl.
CPC ............... *G06F 8/434* (2013.01); *G06F 8/30* (2013.01); *G06F 8/41* (2013.01); *G06F 8/427* (2013.01); *G06F 8/443* (2013.01); *G06F 8/4434* (2013.01); *G06F 8/4441* (2013.01); *G06F 8/458* (2013.01); *G06F 9/467* (2013.01); *G06F 9/52* (2013.01)

(58) Field of Classification Search
CPC ... G06F 8/443; G06F 8/41; G06F 8/30; G06F 8/427

USPC .................................................. 717/140, 153
See application file for complete search history.

(56) References Cited

U.S. PATENT DOCUMENTS

| | | | | |
|---|---|---|---|---|
| 5,926,832 | A  * | 7/1999 | Wing .................... | G06F 9/3834 703/23 |
| 6,173,444 | B1 | 1/2001 | Archambault | |
| 6,332,214 | B1 * | 12/2001 | Wu .......................... | G06F 8/433 717/141 |

(Continued)

OTHER PUBLICATIONS

Bhattacharyya et al., "Automatic Speculative Parallelization of Loops Using Polyhedral Dependence Analysis", 2013.*

(Continued)

*Primary Examiner* — Phillip H Nguyen
(74) *Attorney, Agent, or Firm* — Daniel R. Simek (57) ABSTRACT

An approach to dynamic run-time alias checking comprising creating a main thread and a helper thread, computing an optimized first region of code in a rollback-only transactional memory associated with the main thread checking for one or more alias dependencies in an un-optimized first region of code, responsive to a determination in a predetermined amount of time that no alias dependencies are present in the un-optimized first region of code, committing a transaction and responsive to at least one of a failure to determine results of the check for one or more alias dependencies in the predetermined amount of time and a determination in the predetermined amount of time that alias dependencies are present in the un-optimized first region of code, performing a rollback of the transaction and executing the un-optimized first region of code.

20 Claims, 3 Drawing Sheets

(56) References Cited

U.S. PATENT DOCUMENTS

| | | | | |
|---|---|---|---|---|
| 7,634,635 | B1* | 12/2009 | Holscher | G06F 9/3855 |
| | | | | 711/220 |
| 7,752,613 | B2* | 7/2010 | Guo | G06F 9/45516 |
| | | | | 717/136 |
| 8,151,252 | B2 | 4/2012 | Song et al. | |
| 8,495,607 | B2 | 7/2013 | Gschwind | |
| 8,677,337 | B2 | 3/2014 | Song et al. | |
| 8,832,415 | B2* | 9/2014 | Gala | G06F 9/3004 |
| | | | | 712/207 |
| 8,838,906 | B2* | 9/2014 | Gara | G06F 9/3004 |
| | | | | 711/137 |
| 9,009,689 | B2 | 4/2015 | Krishnaiyer et al. | |
| 2008/0195847 | A1* | 8/2008 | Wu | G06F 9/30043 |
| | | | | 712/216 |
| 2009/0150890 | A1* | 6/2009 | Yourst | G06F 8/445 |
| | | | | 718/102 |
| 2011/0219208 | A1* | 9/2011 | Asaad | G06F 15/76 |
| | | | | 712/12 |
| 2011/0289303 | A1* | 11/2011 | Silvera | G06F 9/3004 |
| | | | | 712/228 |
| 2012/0198428 | A1* | 8/2012 | Schmidt | G06F 8/443 |
| | | | | 717/153 |
| 2014/0331030 | A1 | 11/2014 | Moritz | |
| 2015/0058832 | A1* | 2/2015 | Gonion | G06F 8/433 |
| | | | | 717/150 |
| 2015/0106596 | A1* | 4/2015 | Vorbach | G06F 9/3001 |
| | | | | 712/221 |
| 2016/0179586 | A1* | 6/2016 | Wang | G06F 9/528 |
| | | | | 711/125 |

OTHER PUBLICATIONS

Martinez et al., "Speculative Synchronization: Applying Thread-Level Speculation to Explicitly Parallel Applications" (Year: 2002).*

Oancea et al., "Software Thread-Level Speculation an Optimistic Library Implementation" (Year: 2008).*

Sato et al., "A Mechanism for Speculative Memory Accesses Following Sync hronizing Operations" (Year: 2000).*

List of IBM Patents or Patent Applications Treated as Related, Appendix P, Filed Herewith, 2 pages.

Gao, et al., Dynamic Alias Checking With Transactional Memory, U.S. Appl. No. 15/850,668, filed Dec. 21, 2017.

Ahn et al., "DeAliaser: Alias Speculation Using Atomic Region Support", ASPLOS'13, Mar. 16-20, 2013, Houston, Texas, USA. Copyright © 2013 ACM 978-1-4503-1870-9/13/03, pp. 167-180.

Bhattacharyya et al., "Automatic Speculative Parallelization of Loops Using Polyhedral Dependence Analysis", COSMIC '13 Shenzhen, China, Copyright 2013 ACM 978-1-4503-1971-3/13/02, 9 pages.

Cain et al., "Robust Architectural Support for Transactional Memory in the Power Architecture", ISCA '13 Tel-Aviv, Israel Copyright 2013 ACM 978-1-4503-2079-5/13/06, pp. 225-236.

"Version 2.07", IBM Power ISA™—Book II, May 3, 2013, 1 page.

* cited by examiner

DYNAMIC ALIAS CHECKING WITH TRANSACTIONAL MEMORY

BACKGROUND

The present invention relates generally to the field of compiler optimizations, and more particularly to aliasing.

In computing, compilation is a process in which a compiler transforms source code written in a programming language (e.g., Java, C++, etc.) into machine instructions for creating an executable program. To save time and other resources, a compiler may optimize the code to be compiled. For example, a compiler may minimize or transform certain attributes and/or segments of the code. One such example of a compiler optimization technique is automatic vectorization.

Aliasing is a situation in computer programming where a data object associated with a defined location in computer memory can be accessed through a plurality of different pointers in code. Therefore, changing the data object via any one of the plurality of pointers implicitly changes the data object for all the other associated pointers. This situation may also be referred to as an alias dependence.

SUMMARY

According to one embodiment of the present invention, a method for dynamic run-time alias checking is provided, the method comprising creating, by a dependency checker, a main thread and a helper thread; computing, by the dependency checker, an optimized first region of code in a rollback-only transactional memory associated with the main thread; checking, by the dependency checker, for one or more alias dependencies in an un-optimized first region of code; responsive to a determination in a predetermined amount of time that no alias dependencies are present in the un-optimized first region of code, committing, by the dependency checker, a transaction; and responsive to at least one of a failure to determine results of the check for one or more alias dependencies in the predetermined amount of time and a determination in the predetermined amount of time that alias dependencies are present in the un-optimized first region of code, performing, by the dependency checker, a rollback of the transaction and executing the un-optimized first region of code. A corresponding computer program product and computer system are also disclosed herein.

DETAILED DESCRIPTION

Embodiments of the present invention recognize that with alias dependencies present, an execution of an optimized version of code can lead to incorrect results. The memory locations of data objects associated with pointers are not known at the time of compilation. Therefore, unforeseen alias dependencies may cause optimized executable programs to function incorrectly or differently than expected. With this in mind, embodiments of the present invention provide a solution for dynamic run-time alias checking for the prevention of a transaction to memory associated with an execution of optimized code containing alias dependencies.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
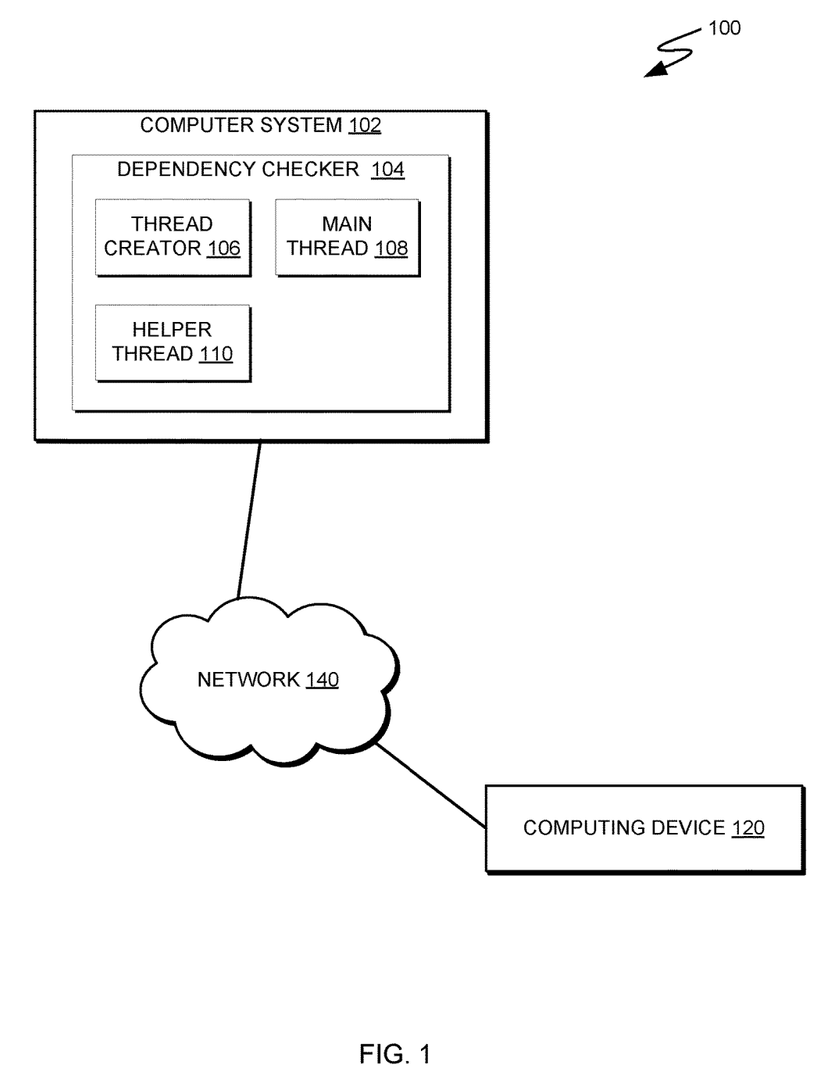
FIG. 1 is a functional block diagram illustrating a distributed data processing environment, in accordance with an embodiment of the present invention.

The present invention will now be described in detail with reference to the figures. FIG. 1 is a functional block diagram illustrating a distributed data processing environment 100, in accordance with one embodiment of the present invention. Distributed data processing environment 100 comprises computer system 102 and communication device 120, interconnected over network 140.

Computer system 102 can be a laptop computer, tablet computer, netbook computer, personal computer (PC), a desktop computer, a personal digital assistant (PDA), a smart phone, or any programmable electronic device capable of communicating with communication device 118 via network 140. Computer system 102 comprises dependency checker 104, a component for dynamically checking program instructions for alias dependencies. Computer system 102 may include internal and external hardware components, as depicted and described in further detail with respect to FIG. 4.

Dependency checker 104 comprises thread creator 106. Thread creator 106 can create a plurality of threads, e.g., main thread 108 and helper thread 110, which can reside on a single processor. In some embodiments, the plurality of threads can reside on a plurality of separate computer processors. Main thread 108 can perform a speculative computation of an optimized version of code in a form of transactional memory such as, but not limited to, a rollback-only transaction. Helper thread 110 is synchronized with main thread 108 and performs address range computations between any pointers which are suspected to be aliased in the optimized region of code that has been speculatively computed by main thread 108. In this way, helper thread 110 can dynamically check for alias dependencies that may be present in the optimized code in parallel with main thread 108 and without having to write any data to memory. Helper thread 110 can communicate results of an alias dependency check to main thread 108 via a synchronization mechanism such as, but not limited to, a pairing of larx (Load and Reserve) and stcx (Store Conditional) instructions.

It should be noted that in the context of this disclosure, a speculative computation can refer to an execution of optimized code, e.g., a region of optimized code, by main thread 108 wherein it is assumed that no alias dependencies are present. An advantage of performing a speculative computation in a transactional memory context is that main thread 108 can be configured not to commit the transaction to memory, e.g., computer memory comprising computer system 102, until it is confirmed that no alias dependencies are present, as will be discussed subsequently in greater detail.

Embodiments of the present invention can utilize rollback-only transactions for performing speculative computations of optimized code. Rollback-only transactions are a form of transactional memory with several advantages over conventional transactions, i.e., atomic transactions. Rollback-only transactions are not used to manipulate shared data and therefore do not adhere to memory coherence protocols for synchronization and conflict tracking required by atomic transactions. Memory barriers associated with instructions for performing atomic transactions add overhead in terms of computing resources consumed. Rollback-only transactions provide greater efficiency in that they do not require memory barriers nor the serialization needed to synchronize with other concurrent (conventional) transactions. Main thread 108 and helper thread 110 are therefore able to run in parallel without conflicting with one another's data.

In various embodiments of the present invention, computing device 120 can be a laptop computer, tablet computer, netbook computer, personal computer (PC), a desktop computer, a personal digital assistant (PDA), a smart phone, or any programmable electronic device capable of communicating with computer system 102 via network 140. Computing device 120 can be generally representative of any number of such computing devices. In some embodiments, main thread 108 and/or helper thread 110 can reside on computer processors comprising computing device 120.

Network 140 can be, for example, a local area network (LAN), a wide area network (WAN) such as the Internet, or a combination of the two, and can include wired, wireless, or fiber optic connections. In general, network 140 can be any combination of connections and protocols that will support communications between computer system 102 and communication device 120.

Figure 2:
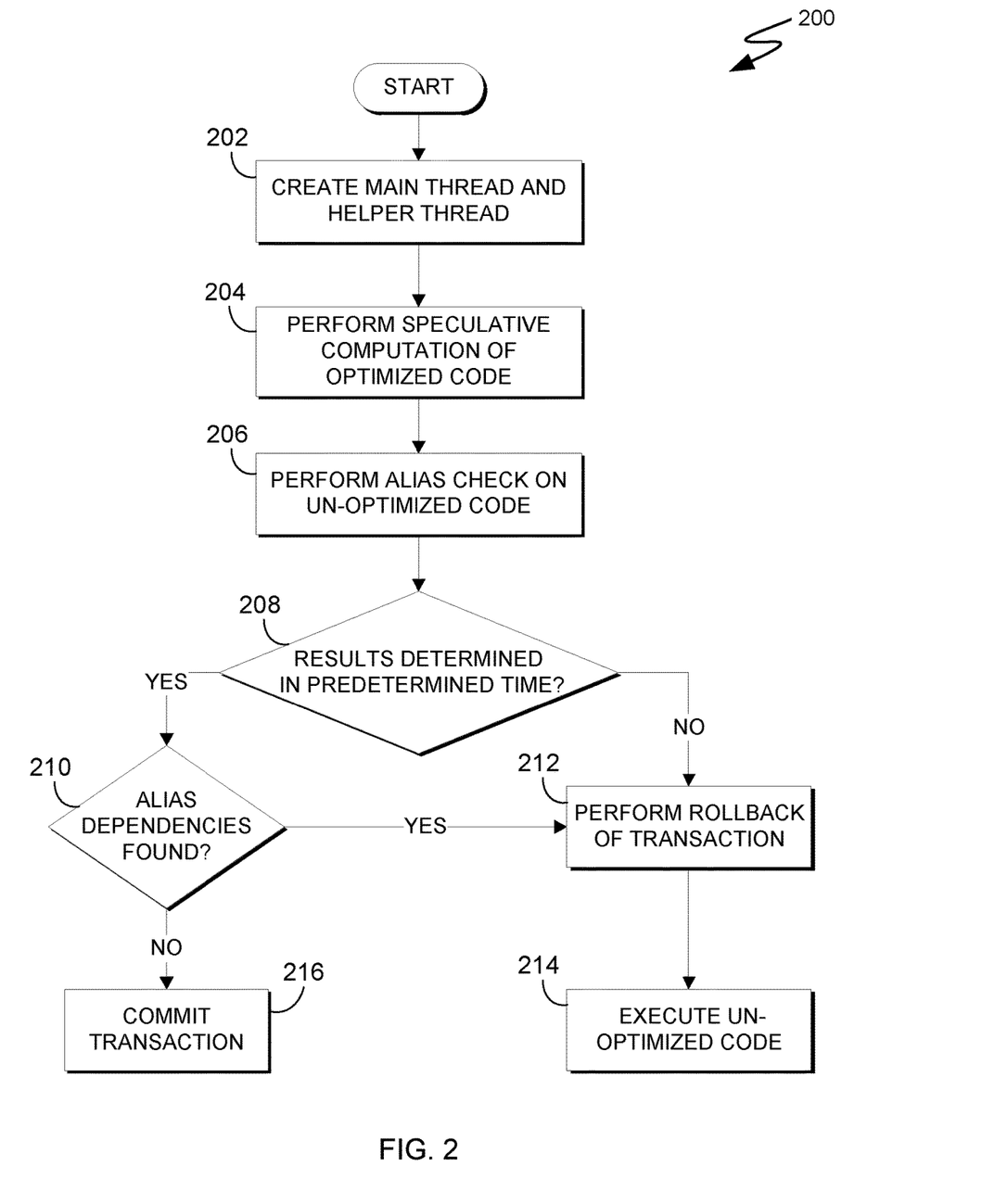
FIG. 2 is a flowchart depicting operational steps of a dependency checker on a computer system within the data processing environment of FIG. 1, in accordance with an embodiment of the present invention.

FIG. 2 is a flowchart 200 depicting operational steps of dependency checker 104 for dynamically checking program instructions for alias dependencies, in accordance with an embodiment of the present invention. The illustrative example of FIG. 2 is provided to facilitate discussion of aspects of the present invention, and it should be appreciated that FIG. 2 provides only an illustration of an embodiment of the present invention and does not imply any limitations with regard to the variations or configurations in which different embodiments may be implemented.

Thread creator 106 creates main thread 108 and helper thread 110 for executing program instructions and checking for alias dependencies (step 202). In one embodiment, main thread 108 and helper thread 110 reside in a process associated with a computer processor comprising computer system 102. Main thread 108 can execute program instructions, e.g., machine code, in a form of transactional memory such as a rollback-only transaction. Helper thread 110 is synchronized with main thread 108 and placed in a busy-wait state until receiving further instructions. For example, main thread 108 executes larx/stcx instructions to tell the helper thread 110 to exit the busy-wait state.

In a form of transactional memory, e.g., a rollback-only transaction, main thread 108 performs a speculative computation of an optimized first region of code, associated with an optimized version of code (step 204). The optimized first region of code may have been optimized by a compiler using an optimization technique such as, but not limited to, automatic vectorization.

Helper thread 110, synchronized with main thread 108, leaves the busy-wait state and performs a check for alias dependencies in an un-optimized version of code (step 206). For example, main thread 108 executes larx/stcx instructions to have helper thread 110 leave the busy-wait state, wherein helper thread 110 performs a check for alias dependencies in an un-optimized first region of code corresponding to the optimized first region of code. Helper thread 110 can perform a conventional alias check such as would be apparent to one of ordinary skill in the art. When helper thread 110 has completed the alias check, helper thread 110 can provide notification of the results of the check to main thread 108. For example, helper thread 110 provides notification via larx/stcx instructions which are visible to main thread 108.

Responsive to determining in a configurable, predetermined amount of time (step 208, YES branch) that no alias dependencies are present in the un-optimized first region of code (step 210, NO branch), main thread 108 commits the transaction to memory (step 216). In other words, the execution of program instructions associated with the optimized first region of code are written to memory. For example, main thread 108 can check periodically for larx/stcx instructions executed by helper thread 110, indicating that no alias dependencies were found. Main thread 108 can begin keeping track of the time helper thread 110 is taking for an alias check, for example, once main thread 108 has sent helper thread 110 instructions to leave the busy-wait state and perform the alias check (step 206). Subsequent to completing the alias check, helper thread 110 can return to the busy-wait state, and main thread 108 can continue execution of program instructions in a non-transactional memory state until arriving at another region of code which has been optimized. Helper thread 110 remains in the busy-wait state until receiving instructions, e.g., from main thread 108, to leave the busy-wait state and perform another alias check for another region of code.

Responsive to a determination of completed alias check results in an amount of time exceeding the predetermined amount of time (step 208, NO branch), main thread 108 performs a rollback of the transaction, wherein the speculatively computed program instructions associated with the optimized first region of code are not committed to memory (step 212). Main thread 108 branches into the un-optimized version of code and executes the un-optimized first region of code (step 214). Alternatively, if main thread 108 determines that alias check results were completed in the predetermined amount of time (step 208, YES branch) but one or more alias dependencies were found (step 210, YES branch), main thread 108 performs a rollback of the transaction (step 212), branches into the un-optimized version of code and executes the un-optimized first region of code (step 214).

Figure 3:
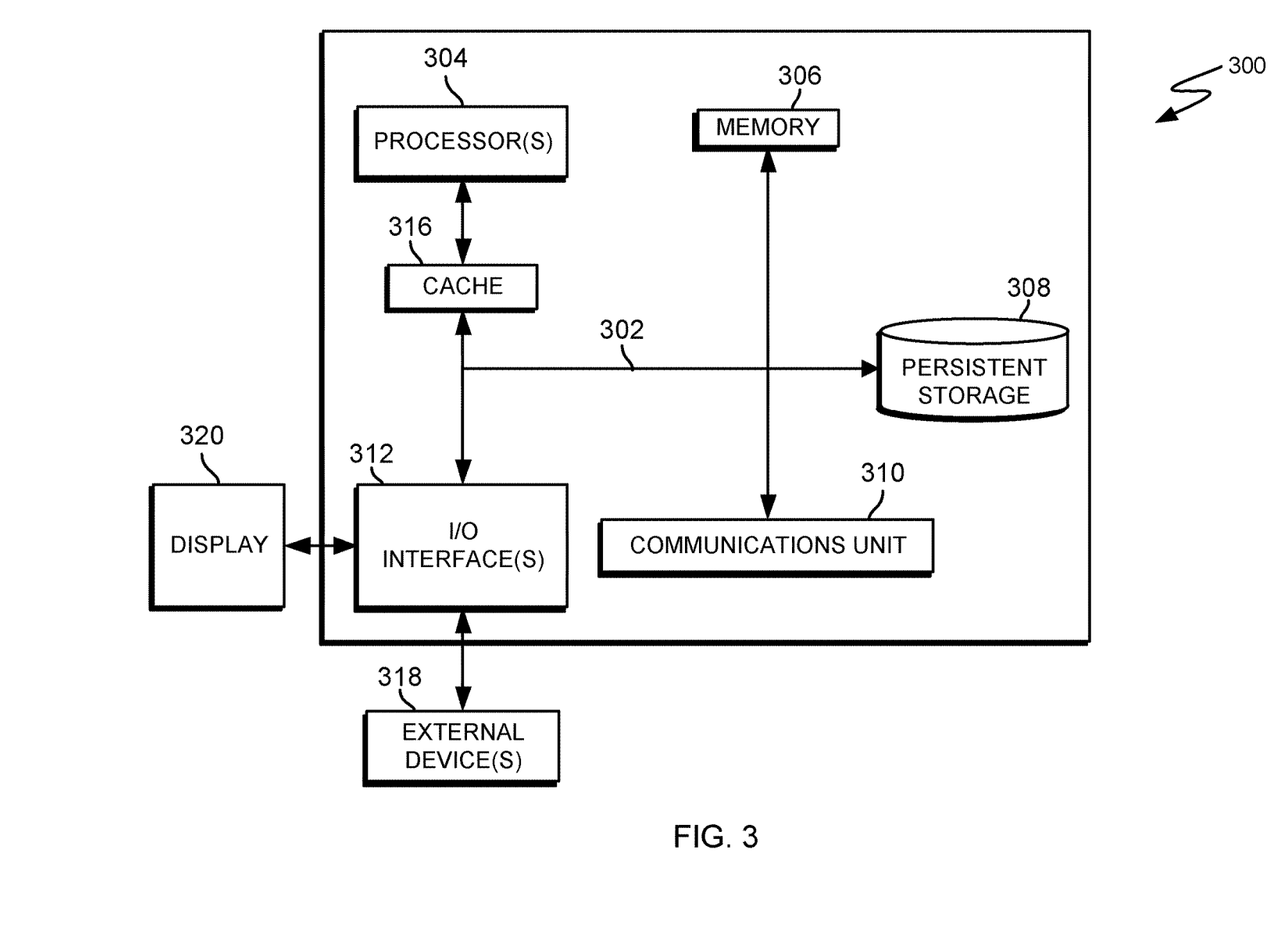
FIG. 3 is a block diagram of components of the computer system executing the dependency checker, in accordance with an embodiment of the present invention.

FIG. 3 depicts a block diagram 300 of components of computer system 102 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer system 102 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Dependency checker 104 can be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 can provide communications through the use of either or both physical and wireless communications links. Dependency checker 104 can be downloaded to persistent storage 308 through communications unit 310.

I/O interface(s) 312 allows for input and output of data with other devices that can be connected to computer system 102. For example, I/O interface 312 can provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., dependency checker 104, can be stored on such portable computer readable storage media and can be loaded onto persistent storage 308 via I/O interface(s) 312. I/O interface(s) 312 also connect to a display 320. Display 320 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for dynamic run-time alias checking, the method comprising:
   creating, by a dependency checker, a main thread and a helper thread of a transaction, wherein a synchronization mechanism between the main thread and the helper thread is enabled by a pair ed instructions;
   performing, by the dependency checker, a speculative computation of an optimized version of a first region of code in a rollback-only transactional memory associated with the main thread, wherein the optimized version of the first region of code is a compiler optimization performed on a region of code corresponding to an un-optimized version of the first region of code;
   transmitting, by the dependency checker via the main thread, instructions setting the helper thread to a busy-wait mode;
   peforming a first check, by the dependency checker, for one or more alias dependencies in the un-optimized version of the first region of code;
   responsive to determining in a predetermined amount of time an absence of alias dependencies in the un-optimized version of the first region of code, committing, by the dependency checker, the transaction; and
   responsive to at least one of: a failure to determine results of the first check for one or more alias dependencies in a predetermined amount of time, and a determination within the predetermined amount of time that alias dependencies are present in the un-optimized version of the first region of code, performing, by the dependency checker, a rollback of the transaction and executing the un-optimized version of the first region of code.

2. The method of claim 1, wherein the optimized version of the first region of code corresponds to the un-optimized version of the first region of code that has received compiler optimization.

3. The method of claim 1, wherein the paired instructions are Load and Reserve (larx)/Store Conditional (stcx) communications and the dependency checker, via the main thread, executes first larx/stcx instructions to have the helper thread leave a busy-wait state.

4. The method of claim 3, wherein the dependency checker, via the helper thread, executes second larx/stcx instructions to perform the first check for the one or more alias dependencies.

5. The method of claim 4, wherein the main thread receives notification of results of the first check, which are visible to the main thread, based on larx/stcx instructions of the helper thread.

6. The method of claim 1, wherein committing the transaction comprises writing an execution of the optimized version of the first region of code to computer memory.

7. The method of claim 1, wherein performing a first check, by the dependency checker, includes the main thread executing a larx/stcx instruction for the helper thread to leave the busy-wait state and perform a check for alias dependencies in the un-optimized version of the first region of code, corresponding to the optimized version of the first region of code.

8. A computer program product for dynamic run-time alias checking, the computer program product comprising:
   one or more computer readable storage media and program instructions stored on the one or more computer readable storage media, the program instructions comprising:

program instructions to create, a main thread and a helper thread of a transaction, wherein a synchronization mechanism between the main thread and the helper thread is enabled by a pairing of larx (Load and Reserve) and stcx (Store Conditional) instructions;

program instructions to perform, a speculative computation of an optimized version of first region of code in a rollback-only transactional memory associated with the main thread, wherein the optimized version of the first region of code is a compiler optimization performed on a region of code corresponding to an un-optimized version of the first region of code;

program instructions to transmit via the main thread, instructions setting the helper thread to a busy-wait mode;

program instructions to perform a run-time first check associated with the helper thread for one or more alias dependencies in the un-optimized version of the first region of code, wherein the helper thread synchronized with the main thread to leave the busy-wait mode prior performing the first runtime check for one or more alias dependencies;

program instructions to commit, the transaction, responsive to a determination in a predetermined amount of time an absence of alias dependencies in the un-optimized version of the first region of code; and program instructions to perform, a rollback of the transaction and execute the un-optimized version of the first region of code, responsive to at least one of: a failure to determine results of the first check for one or more alias dependencies in a predetermined amount of time, and a determination within the predetermined amount of time that alias dependencies are present in the un-optimized version of the first region of code.

9. The computer program product of claim 8, wherein the optimized version of the first region of code corresponds to the un-optimized version of the first region of code that has received compiler optimization.

10. The computer program product of claim 8, wherein the paired instructions are Load and Reserve (larx)/Store Conditional (stcx) communications and program instructions, via the main thread, execute first larx (Load and Reserve)/stcx (Store Conditional) instructions to have the helper thread leave a busy-wait state.

11. The computer program product of claim 10, wherein program instructions, via the helper thread, execute second larx/stcx instructions to perform the first check for the one or more alias dependencies.

12. The computer program product of claim 11, wherein the main thread receives notification of results of the first check, which are visible to the main thread, based on larx/stcx instructions of the helper thread.

13. The computer program product of claim 8, wherein committing the transaction comprises writing an execution of the optimized version of the first region of code to computer memory.

14. The computer program product of claim 8, wherein program instructions to perform a first check includes the main thread executing a larx/stcx instruction for the helper thread to leave the busy-wait state and perform a check for alias dependencies in the un-optimized version of the first region of code, corresponding to the optimized version of the first region of code.

15. A computer system for dynamic run-time alias checking, the computer system comprising:
    one or more computer processors;
    one or more computer readable storage media;
    program instructions stored on the one or more computer readable storage media for execution by at least one of the one or more processors, the program instructions comprising:
    program instructions to create, a main thread and a helper thread of a transaction, wherein a synchronization mechanism between the main thread and the helper thread is enabled by paired instructions wherein Load and Reserve/Store Conditional (larx/stcx) instructions enable a synchronization mechanism between the main thread and the helper thread;
    program instructions to perform a speculative computation of an optimized version of first region of code in a rollback-only transactional memory associated with the main thread, wherein the optimized version of the first region of code is a compiler optimization performed on a region of code corresponding to an un-optimized version of the first region of code;
    program instructions to transmit via the main thread, instructions setting the helper thread to a busy-wait mode;
    program instructions to perform a run-time first check associated with the helper thread for one or more alias dependencies in the un-optimized version of the first region of code, wherein the helper thread synchronized with the main thread to leave the busy-wait mode prior performing the first runtime check for one or more alias dependencies;
    program instructions to commit the transaction, responsive to a determination in a predetermined amount of time an absence of alias dependencies in the un-optimized version of the first region of code; and
    program instructions to perform a rollback of the transaction and execute the un-optimized version of the first region of code, responsive to at least one of: a failure to determine results of the first check for one or more alias dependencies in a predetermined amount of time, and a determination within the predetermined amount of time that alias dependencies are present in the un-optimized version of the first region of code.

16. The computer system of claim 15, wherein the optimized version of the first region of code corresponds to the un-optimized version of the first region of code that has received compiler optimization.

17. The computer system of claim 15, wherein the paired instructions are Load and Reserve (larx)/Store Conditional (stcx) communications and program instructions, via the main thread, execute first larx (Load and Reserve)/stcx (Store Conditional) instructions to have the helper thread leave a busy-wait state.

18. The computer system of claim 17, wherein program instructions, via the helper thread, execute second larx/stcx instructions to perform the first check for the one or more alias dependencies.

19. The computer system of claim 18, wherein the main thread receives notification of results of the first check, which are visible to the main thread, based on larx/stcx instructions of the helper thread.

20. The computer system of claim 15, wherein program instructions to perform a first check includes the main thread executing a larx/stcx instruction for the helper thread to leave the busy-wait state and perform a check for alias dependencies in the un-optimized version of the first region of code, corresponding to the optimized version of the first region of code.

\* \* \* \* \*